(12) United States Patent
Seo et al.

(10) Patent No.: US 11,591,037 B2
(45) Date of Patent: Feb. 28, 2023

(54) VARIABLE WHEELED VEHICLE

(71) Applicants: Hyundai Motor Company, Seoul (KR); Kia Motors Corporation, Seoul (KR)

(72) Inventors: Eun Ho Seo, Gyeonggi-do (KR); Hun Keon Ko, Gyeonggi-do (KR); Jun Hwan Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 234 days.

(21) Appl. No.: 16/922,480

(22) Filed: Jul. 7, 2020

(65) Prior Publication Data
US 2021/0155312 A1     May 27, 2021

(30) Foreign Application Priority Data

Nov. 27, 2019    (KR) ................. 10-2019-0154665

(51) Int. Cl.
    *B62K 13/04*       (2006.01)
    *B62J 1/08*        (2006.01)
                  (Continued)

(52) U.S. Cl.
    CPC ............... *B62K 13/04* (2013.01); *B62J 1/04* (2013.01); *B62J 1/08* (2013.01); *B62J 45/40* (2020.02);
                  (Continued)

(58) Field of Classification Search
    CPC .. B62K 13/04; B62K 21/10; B62J 1/04; B62J 45/4151; B62J 45/40
    See application file for complete search history.

(56) References Cited

U.S. PATENT DOCUMENTS 3,618,970 A    11/1971    Frigaard
5,248,011 A *   9/1993    Richards ................. B60G 3/01
                                                 180/215
(Continued)

FOREIGN PATENT DOCUMENTS

CN          2745834 Y     12/2005
CN         206255135 U     6/2017
(Continued)

OTHER PUBLICATIONS

Second Office Action for Chinese Patent Application No. 201911148145. 5, dated Oct. 21, 2022, with English translation, 7 pages.

*Primary Examiner* — Jacob D Knutson
*Assistant Examiner* — Ryan Edward Hardy
(74) *Attorney, Agent, or Firm* — Fox Rothschild LLP (57) ABSTRACT

A vehicle includes a main body configured to allow a user to ride on the main body, two driving wheels rotatably coupled to the main body, and a controlling wheel part rotatably coupled to the main body to control a direction of the vehicle in which the main body travels at a specific drive velocity by making contact with a ground surface to rotate about a vertical direction in a three-wheel mode. The main body includes a seat part formed to receive the user in a seated position, a steering part configured to obtain an inclination degree to perform steering based on the inclination degree in which the user seated on the seat part is inclined, in the three-wheel mode, and a post configured to connect the steering part with the seat part.

16 Claims, 9 Drawing Sheets

(51) Int. Cl.
*B62K 21/12* (2006.01)
*B62K 21/10* (2006.01)
*B62K 5/05* (2013.01)
*B62J 45/40* (2020.01)
*B62K 11/00* (2006.01)
*B62J 1/04* (2006.01)
*B62K 13/02* (2006.01)

(52) U.S. Cl.
CPC .............. *B62K 5/05* (2013.01); *B62K 11/007* (2016.11); *B62K 13/02* (2013.01); *B62K 21/10* (2013.01); *B62K 21/12* (2013.01)

(56) References Cited

U.S. PATENT DOCUMENTS

| | | | |
|---|---|---|---|
| 6,460,866 B1 | 10/2002 | Altschul et al. | |
| 6,561,294 B1 | 5/2003 | Kamen et al. | |
| 7,159,681 B1 | 1/2007 | Sauve | |
| 8,469,374 B2 | 6/2013 | Graf Von Bismarck | |
| 9,272,739 B2 * | 3/2016 | Zaid | B62K 21/12 |
| 9,339,431 B2 * | 5/2016 | Menard | B62K 11/007 |
| 9,688,340 B1 * | 6/2017 | Kroymann | A63C 17/28 |
| 10,421,515 B2 * | 9/2019 | Koo | B62M 7/12 |
| 2004/0100083 A1 * | 5/2004 | Brackett | B62K 11/007 280/762 |
| 2004/0113395 A1 | 6/2004 | Nimis | |
| 2006/0108165 A1 * | 5/2006 | Kamen | B62D 37/00 180/233 |
| 2009/0255747 A1 | 10/2009 | Kasaba et al. | |
| 2017/0190377 A1 * | 7/2017 | Ku | B62J 1/04 |
| 2018/0015978 A1 * | 1/2018 | Delgatty | B62K 25/04 |
| 2018/0022411 A1 * | 1/2018 | Kistemaker | A63B 55/60 180/208 |
| 2018/0056152 A1 | 3/2018 | Reimers et al. | |
| 2020/0008990 A1 | 1/2020 | Harrison | |
| 2020/0189682 A1 | 6/2020 | Ko et al. | |

FOREIGN PATENT DOCUMENTS

| | | | | |
|---|---|---|---|---|
| EP | 2514661 A1 | 10/2012 | | |
| WO | WO-2011031992 A2 * | 3/2011 | ............. | B60L 11/18 |
| WO | 2011-0132185 A1 | 10/2011 | | |
| WO | WO-2015143523 A1 * | 10/2015 | ............. | B62K 3/005 |
| WO | WO-2016170364 A1 * | 10/2016 | ............. | A61G 5/042 |
| WO | WO-2017164928 A1 * | 9/2017 | ............. | B62B 3/02 |
| WO | WO-2020178842 A1 * | 9/2020 | | |

* cited by examiner

VARIABLE WHEELED VEHICLE

CROSS-REFERENCE TO RELATED APPLICATION

This application claims under 35 U.S.C. § 119(a) the benefit of Korean Patent Application No. 10-2019-0154665, filed in the Korean Intellectual Property Office on Nov. 27, 2019, the entire contents of which are incorporated herein by reference.

BACKGROUND

(a) Technical Field

The present disclosure relates to a vehicle capable of travelling using a variable number of wheels.

(b) Description of the Related Art

Recently, small-size vehicles have been developed. Such small-size vehicles may be used in various driving environments, such as sidewalks or narrow alleys as well as typical roads, depending on characteristics and uses of the small-size vehicles, which are typically used by one person in shorter distance driving. In addition, although the small-size vehicles are mainly used for shorter distance driving at low speeds, high-speed driving may be required.

Small-size vehicles may need to be driven in different driving modes and configurations as compared to typical vehicles in accordance with the various driving environments and as required by the user. In addition, there is needed a small-sized vehicle capable of easily switching between the different driving modes.

SUMMARY

An aspect of the present disclosure provides a variable wheeled vehicle.

According to an aspect of the present disclosure, a vehicle includes a main body provided to allow a user to ride on the main body, two driving wheels rotatably coupled to the main body, and a controlling wheel part rotatably coupled to the main body to steer a direction in which the main body travels at a specific drive velocity by making contact with a ground surface to rotate about a vertical direction in a three-wheel mode. The main body includes a seat part formed to receive the user in a seated position, a steering part configured to obtain an inclination degree to perform steering based on the inclination degree in which the user seated on the seat part is inclined, in the three-wheel mode, and a post configured to connect the steering part with the seat part.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. When a certain component is "linked to", "coupled to", or "connected with" another component, the certain component may be directly linked to or connected with the another component, and a third component may be "linked", "coupled", or "connected" between the certain component and the another component.

Figure 1:
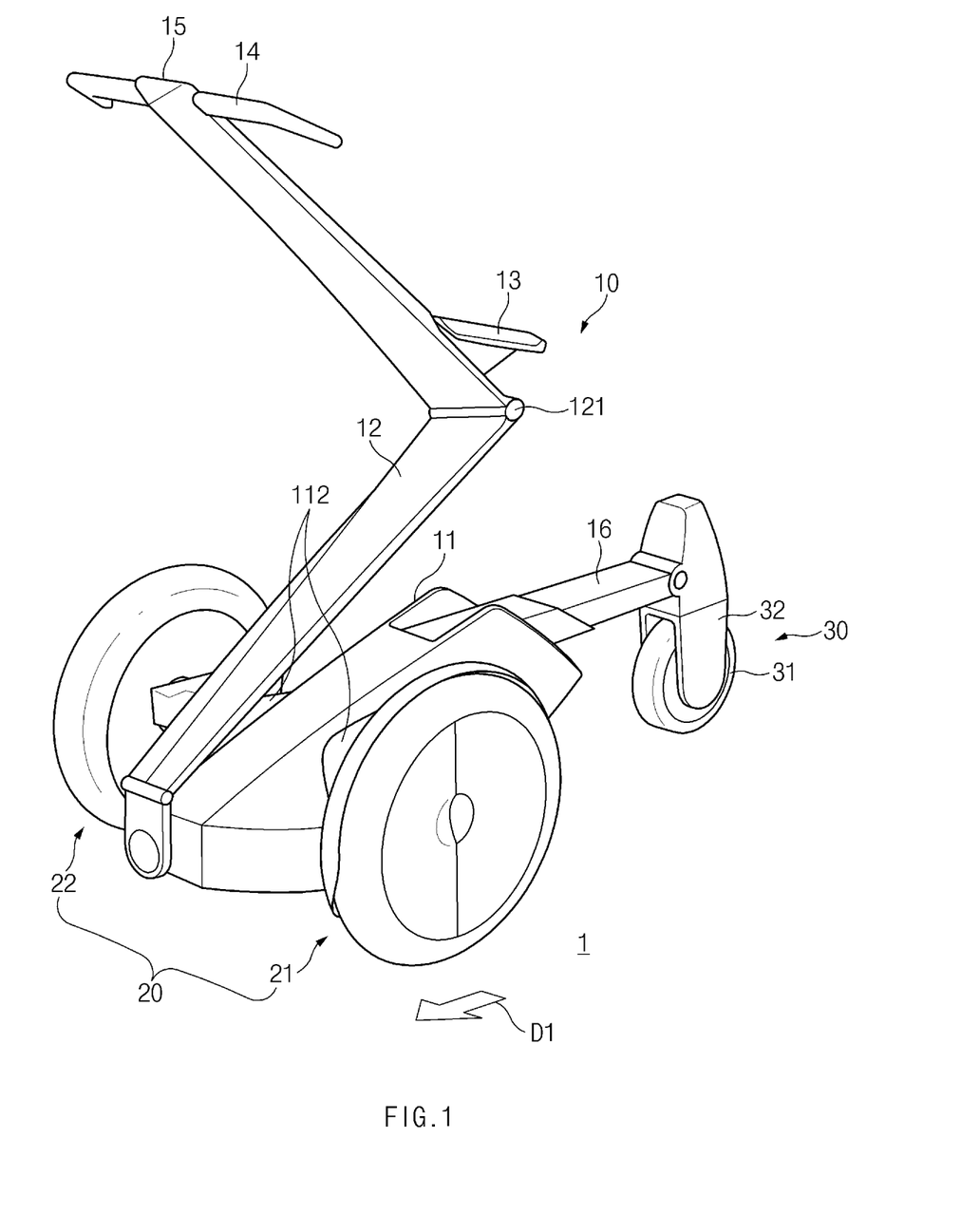
FIG. 1 is a perspective view illustrating a vehicle, according to an embodiment of the present disclosure.

FIG. 1 is a perspective view illustrating a vehicle 1, according to an embodiment of the present disclosure.

Referring to FIG. 1, according to an embodiment of the present disclosure, a variable wheeled vehicle 1 (hereinafter, simply referred to as a "vehicle 1") may include a main body 10, a driving wheel 20, and a controlling wheel part 30, and may further include a processor to control the overall operation of the vehicle 1. In the following description of the present disclosure, the terms "left-right direction", "up-down direction", and "front-rear direction" are provided for the convenience of explanation, and thus may be changed to other directions depending on the state in which the vehicle 1 is arranged. Accordingly, an advancing direction D1 may be a forward direction, but the present disclosure is not limited thereto.

Driving Wheel 20

The driving wheel 20 rotates to allow the vehicle 1 to travel, according to an embodiment of the present disclosure. Two driving wheels 20 are provided and rotatably coupled to left and right ends of the main body 10 such that the main body 10 travels in an advancing direction D1 at a specified drive velocity. The driving wheel 20 positioned at the left side of the main body 10 may be referred to as a left driving wheel 21, and the driving wheel 20 positioned at the right side of the main body 10 may be referred to as a right driving wheel 22.

The driving wheel 20, which includes a wheel driving part, may rotate a driving wheel case forming the outer appearance of the driving wheel 20 and having a wheel shape. Although the wheel driving part is disposed outside the driving wheel case and coupled to or fixed to the main body 10, the wheel driving part may be disposed inside the driving wheel case to rotate the driving wheel case in an in-wheel manner. When the wheel driving part rotates the driving wheel case in the in-wheel manner, an inner surface of the driving wheel case is engaged with the wheel driving part through a gear, such that the driving wheel case may be rotated by driving force generated from the wheel driving part.

The two driving wheels 20 are provided at opposite ends of the main body 10, respectively, one by one to rotate about the same driving rotation shaft while rotating in opposite directions. Accordingly, the main body 10 may move forward in the advancing direction D1 or may move rearward in a direction opposite to the advancing direction D1, through the driving wheels 20. The driving rotation shaft may be parallel to the left-right direction.

To rotate the driving wheels 20 in the opposite direction, two wheel driving parts, which are disposed in the driving wheels 20, respectively, generate driving forces, which are used to rotate the driving wheels 20 in the opposite direction, such that the driving wheels 20 move forward or rearward. However, the two wheel driving parts rotate the driving wheels 20 in the same direction to change the direction of the main body 10.

Figure 2:
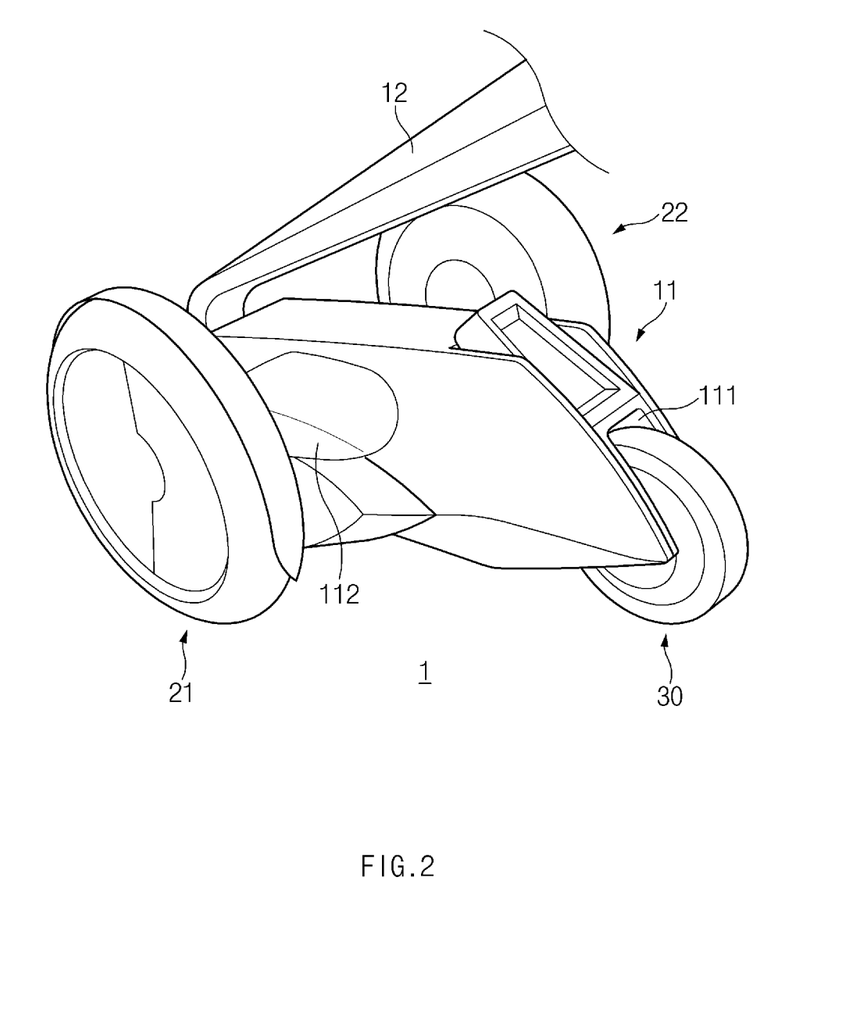
FIG. 2 is a perspective view illustrating the shape of a vehicle in a two-wheel mode, according to an embodiment of the present disclosure.

FIG. 2 is a perspective view illustrating a shape or configuration of a vehicle in a two-wheel mode, according to an embodiment of the present disclosure.

Hereinafter, the two-wheel mode will be further described with reference to FIG. 2. According to an embodiment of the present disclosure, the vehicle 1 may have a two-wheel mode and a three-wheel mode. The vehicle 1 may be selectively operable in the two-wheel mode or the three-wheel mode. The vehicle 1 may be driven only through the two driving wheels 20 in the two-wheel mode, and may be driven through the total of three wheels, which include two driving wheels 20 and one controlling wheel 31, in the three-wheel mode. The two-wheel mode is a mode allowing the user to ride while being upright on the main body 10 similarly to a SEGWAY, and the three-wheel mode is a mode allowing the user to stably ride at a higher speed while being seated similarly to a scooter. Any one of the two-wheel mode and the three-wheel mode may be selectively performed by changing the arrangement of the controlling wheel part 30 of the vehicle 1. A control operation performed in each mode may not be performed when another mode is activated.

Accordingly, the driving wheel 20 may be accelerated or decelerated depending on the degree that the main body 10 is inclined forward or rearward in the two-wheel mode. A forward inclination or a rearward inclination of the main body 10 may be obtained through an inclination obtaining part. The inclination obtaining part may include a gyroscope sensor or an acceleration sensor. The inclination obtaining part may be disposed in the main body 10.

In addition, in the two-wheel mode, the two driving wheels 20 may be steered in the state that an imbalance in velocity of the two driving wheels 20 may be formed as a handle 14 to be described later is operated. Hereinafter, such a steering manner in the two-wheel mode will be described.

Controlling Wheel Part 30

The controlling wheel part 30 is a component operating for steering in a three-wheel mode. The controlling wheel part 30 may be spaced apart from the ground surface without making contact with the ground surface in the two-wheel mode, and may protrude outward to make contact with the ground surface in the three-wheel mode. Accordingly, the controlling wheel part 30 may not perform any operation in the two-wheel mode. In the three-wheel mode, the controlling wheel 31 of the controlling wheel part 30, which rotates while making contact with the ground surface, further rotates about a vertical axis to perform a steering operation of changing the advancing direction D1 of the vehicle 1. An angle of rotating about the vertical axis by the controlling wheel part 30 may be referred to as a steering angle.

In the three-wheel mode, the controlling wheel part 30 may be positioned further back in the vehicle than the two driving wheels 20 in the advancing direction D1. Accordingly, the vehicle 1 is driven in a driving manner in which, when the driving wheels 20 positioned closer to a front side start to roll, the controlling wheel part 30 performing driven-rotation performs steering to change the advancing direction D1.

The controlling wheel part 30 may include the controlling wheel 31 and a controlling wheel holder 32. The controlling wheel 31 is a wheel-shaped part rotating while making contact with the ground surface in the three-wheel mode, and the controlling wheel holder 32 is coupled to the controlling wheel 31 such that the controlling wheel 31 rotates about a rotational shaft parallel to a horizontal direction. Simultaneously, the controlling wheel holder 32 may be coupled to a distance adjusting part 16 included in the main body 10 such that the controlling wheel holder 32 is rotatable about a rotational shaft parallel to the vertical direction. Accordingly, the controlling wheel 31 is coupled such that the controlling wheel 31 is rotatable about one rotational shaft parallel to the horizontal direction and rotatable about the rotational shaft parallel to the vertical direction.

When the controlling wheel 31 is coupled to the controlling wheel holder 32, the coupling may be achieved even if the controlling wheel 31 may perform only the driven rotation. Accordingly, an additional driving part or a connection structure to transmit power may not be required. However, when the controlling wheel holder 32 is coupled to the main body 10, the rotation of the controlling wheel 31 about the vertical direction has to be performed through the steering by the user. Accordingly, a holder driving part to rotate the controlling wheel holder 32 about the vertical direction or a connection structure to transmit power to the controlling wheel holder 32 may be further provided.

The main body 10 may further include the distance adjusting part 16 to adjust the distance between the controlling wheel part 30 and the driving wheel 20, in the three-wheel mode. The distance adjusting part 16 may have the structure of protruding from a case 11 of the main body 10 or of being introduced into the case 11. The distance adjusting part 16 has a part to adjust a length or a part coupled to the controlling wheel part 30 and rotatably coupled to the part to adjust the length. Accordingly, the distance adjusting part 16 may allow the controlling wheel part 30 to be received in the case 11 or to protrude to make contact with the ground surface.

In the two-wheel mode, as illustrated in FIG. 2, the distance adjusting part 16 is shorted such that the case 11 is closer to the controlling wheel part 30, or the controlling wheel part 30 is introduced into the case 11 through a case opening 111 formed in the case 11 such that the controlling wheel part 30 is positioned inside the case 11. In the three-wheel mode, as illustrated in other drawings, the distance adjusting part 16 may protrude outward from the case 11, such that the controlling wheel 31 becomes away from the case 11 or makes contact with the ground surface.

The distance adjusting part 16 may adjust the rotation radius of the vehicle 1 in the three-wheel mode, by adjusting the distance between the controlling wheel part 30 and the case 11.

Main Body 10

The main body 10 is provided in such a manner that the user is able to ride, and serves as the center allowing the wheels to be coupled to each other. The main body 10 may include a handle 14, a display part 15, a seat part 13, a post 12, the case 11, the distance adjusting part 16, and a steering part 18

The case 11 may be rotatably coupled to the driving wheel and may be coupled to the controlling wheel part 30 through the distance adjusting part 16. The controlling wheel part 30 may be introduced into the case 11 by the distance adjusting part 16. A foothold 112 is formed on the case 11 such that the user is able to place the foot on the foothold 112 and to stand up while stepping on the foothold 112. A pedal is formed on the foothold 112 such that the user is able to press the pedal to accelerate or decelerate the vehicle 1 in the three-wheel mode.

The post 12, which is a component coupled to the steering part 18 provided in the case 11, has an upper end to be coupled to the handle 14 and an middle part having the seat part 13 provided to receive the user in a seated position. Accordingly, as the user grips the handle 14 to incline the main body 10 left or right for steering the post 12 may be inclined. In addition, when the user inclines the main body 10 for steering while being seated on the seat part 13, the post 12 may be inclined as the controlling wheel part 30 is inclined to one side.

Figure 3:
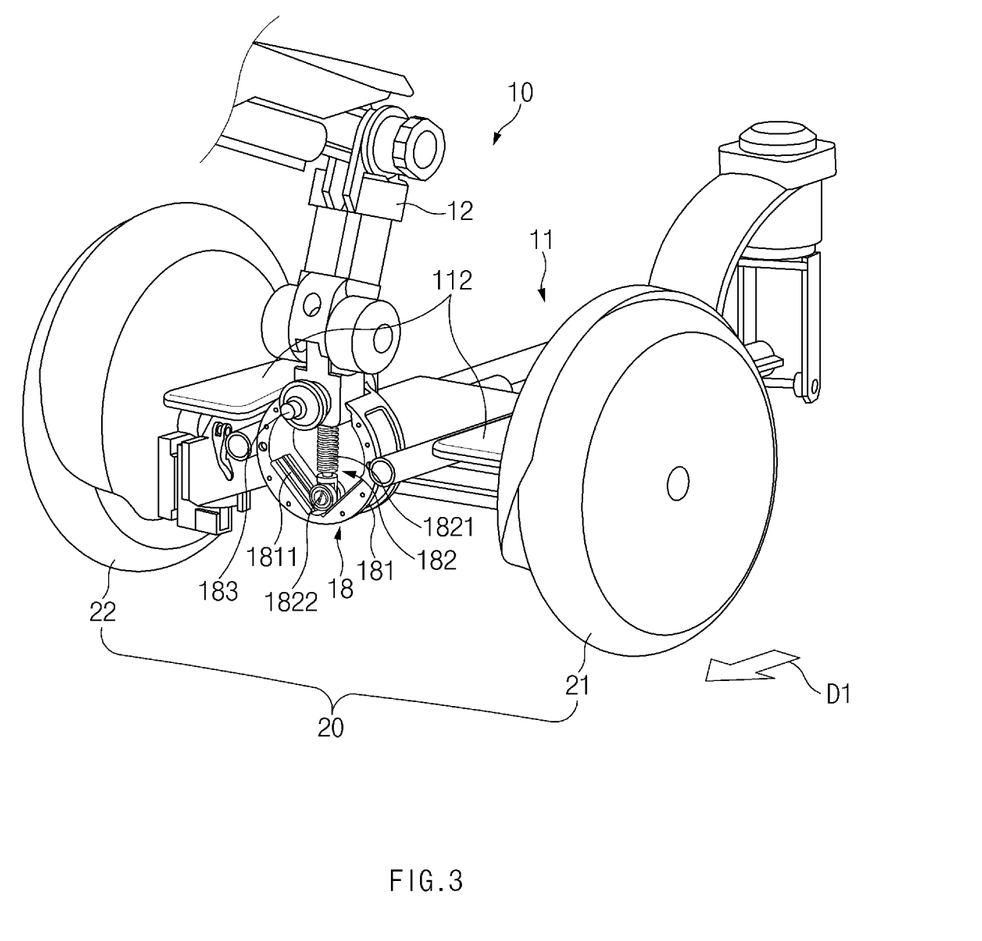
FIG. 3 is a view illustrating a steering housing partially cut away to expose the internal structure of a steering part of a vehicle, according to an embodiment of the present disclosure.
Figure 4:
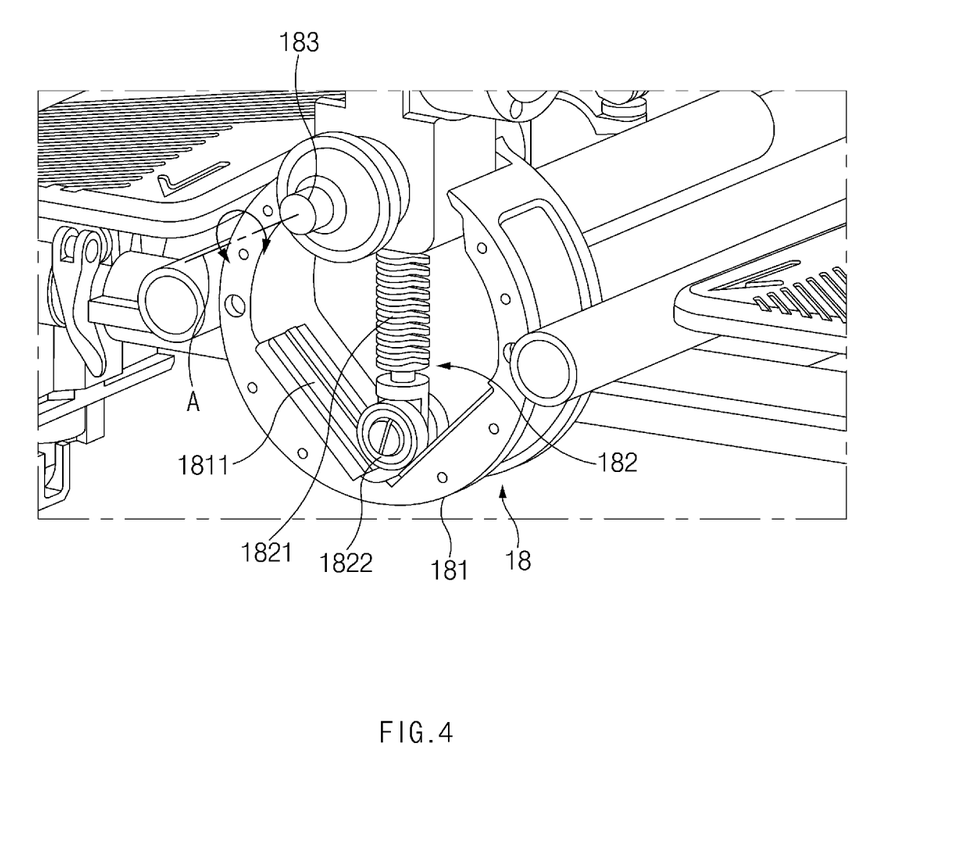
FIG. 4 is an enlarged view of the steering part of FIG. 3.

FIG. 3 is a view illustrating a steering housing 181 partially cut away to expose the internal structure of the steering part 18 of the vehicle 1, according to an embodiment of the present disclosure. FIG. 4 is an enlarged view of the steering part 18 of FIG. 3.

Hereinafter, the steering part 18 will be further described with reference to FIGS. 3 and 4. When the user inclines the post 12 for steering the steering part 18 may obtain the inclination degree of the post 12 and may use the obtained inclination for the steering of the vehicle 1. In other words, in the three-wheel mode, the post 12 is inclined depending on the degree that the body of the user seated on the seat part 13 is inclined, such that the steering is performed. To this end, the steering part 18 may include a steering value obtaining part, a steering shaft member 183, a steering returning part 182, and a steering housing 181.

The steering shaft member 183, which is a shaft member coupled to the lower end of the post 12, is disposed to rotate about a steering rotation axis 'A' parallel to the advancing direction D1. The post 12 may rotate about the steering shaft member 183.

The rotation degree of the steering shaft member 183 may be a steering value. The steering value obtaining part is disposed adjacent to the steering shaft member 183 to obtain, as a steering value, the rotation angle of the steering shaft member 183. The steering value obtaining part may include an encoder. The steering value obtaining part may be disposed in the steering housing 181.

The steering returning part 182, which is disposed inside the steering housing 181, to return the post 12 to the original state. The steering returning part 182 may include an elastic member 1821 and a cam 1822. The elastic member 1821 disposed in parallel to the vertical direction may have an upper end coupled to the steering shaft member 183 and a lower end coupled to the cam 1822. The cam 1822 may be formed with a curved-shape outer surface to slide along a guide surface 1811 formed to be inclined with respect to the inner surface of the housing 181. As illustrated in FIGS. 3 and 4, when the cam 1822 is formed in a wheel shape, the cam 1822 may be rolled along the guide surface 1811.

The cam 1822 is divided into two parts spaced apart from each other in the advancing direction D1 to be prevented from deviating from the guide surface 1811. The guide surface 1811 may include a guide protrusion inserted into a gap between the two parts of the cam 1822 to prevent the cam 1822 from deviating from the guide surface 1811 in the advancing direction D1.

The steering returning part 182 is in a basic state in which the steering is not performed and the cam 1822 is positioned at the center in the left-right direction and at the lowermost side. In the basic state, the post 12 may also not be inclined to either of the left and right sides. When the steering shaft member 183 rotates as the post 12 is inclined, the steering returning part 182 is also inclined while the cam 1822 moves left-upward or right-upward along the guide surface 1811. Accordingly, the elastic member 1821 is compressed such that the elastic force is applied to return the steering returning part 182 to be in the basic state. When the user stops the input for steering to the post 12, the steering returning part 182 may be returned to be in the basic state due to the elastic force, and the post 12 may be returned to be in the state that the post 12 is not inclined to any side.

The guide surface 1811 may be formed to be inclined left-upward and right-upward, at the left and right sides of the steering returning part 182 in the basic state. Accordingly, the cam 1822 of the steering returning part 182 in the basic state is placed in a valley formed in the guide surface 1811.

Figure 5:
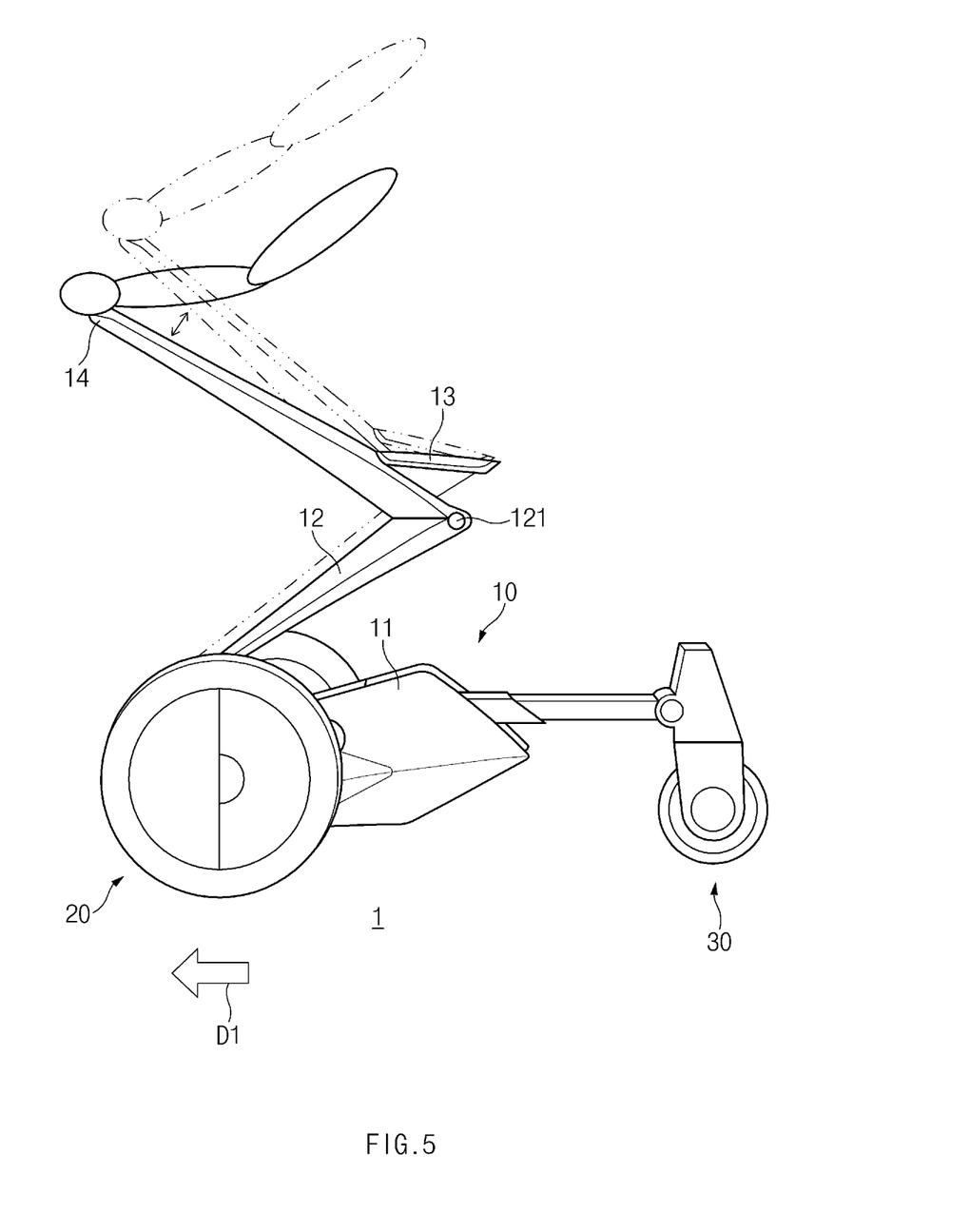
FIG. 5 is a view illustrating a situation of adjusting a height of a seat part of a vehicle, according to an embodiment of the present disclosure.

FIG. 5 is a view illustrating a situation of adjusting a height of the seat part 3 of the vehicle 1, according to an embodiment of the present disclosure.

Hereinafter, adjusting the height of the main body 10 will be further described with reference to FIG. 5. The handle 14 is a part operated by a user such that the main body 10 is steered in the two-wheel mode. However, the user may grip the handle 14 in the state that the user is seated on the seat part 13 in the three-wheel mode. Although the user grips the handle 14 and performs the steering by inclining the post 12 to the left or the right, the structure, in which only the movement of the handle 14 is transferred to the steering part 18 without the movement of the post 12, may be provided as the handle 14 is rotatably coupled to the post 12.

In the two-wheel mode, the steering may be performed, as the user rotates the post 12 about an extension direction of the post 12 using the handle 14, or the handle 14 is rotatably coupled to the post 12 to be rotated. Accordingly, the control operation over the handle 14 may be locked in the three-wheel mod, so even if the handle 14 is operated by the user in the three-wheel mode, any control signal or any physical change is not made in the steering part 18. Accordingly, the operations of the handle 14 and the steering part 18 may be regardless of each other in the three-wheel mode. In addition, when the handle 14 is controlled in the two-wheel mode, the angle of the post 12 formed with respect to the steering part 18 may be constantly maintained.

The handle 14 may further include an operating part to be operated by the user such that the vehicle 1 is accelerated or decelerated.

The post 12 may have at least one joint 121 such that the post 12 is bent in the front-rear direction. As the joint 121, which is able to bend the post 12, is formed on the post 12, the seat part 13 coupled to the post 12 may be lifted. The user may lift the seat part 13 and the handle 14 by operating the post 12, for example, in a manner in which the user grips the handle 14 and applies the force in the up-down directio.

The user may ride on the vehicle 1 and drive the vehicle 1, in the upright state by increasing the heights of the handle 14 and the seat part 13, and may drive the vehicle 1 in the seated state on the seat part 13 by lowering the heights of the handle 14 and the seat part 13. In FIG. 5, a state in which the height of the seat part 13 is increased is indicated by a dashed line, and a state in which the height of the seat part 13 is lowered is indicated by a solid line.

A display part 15 including a display device is formed to be adjacent to the handle 14 such that the information on a vehicle velocity is recognized by the user. Alternatively, an input part including an input device, such as a button, is disposed to be adjacent to the handle 14, such that the user may select one of the two-wheel mode or the three-wheel mode. The input part and the display part 15 may be implemented with the same touch screen.

Processor

A processor, which is a component that includes a device allowing logical operations to execute a control instruction, may include a central processing unit (CPU). The processor may be connected to components that require electrical control, to transmit signals based on control commands to the components. In addition, the processor may be connected with various sensors or obtaining parts to receive obtained information in the form of a signal. The processor may be electrically connected with the components. Accordingly, a communication module connected with the processor through a conductive line or being able to make wireless communication with the processor wirelessly may be further provided, such that the processor may make communication with the components. Such a processor may be embedded in the case 11, but may be embedded in another part of the main body 10.

The control instruction executed by the processor may be stored in the storage medium and utilized. The storage medium may be a device, such as a hard disk drive (HDD), a solid state drive (SSD), a server, a volatile medium, or a nonvolatile medium. In addition, the storage medium may further store data necessary for the processor to perform a task.

When the user selects a driving mode, the processor may control the distance adjusting part 16 such that the controlling wheel part 30 is positioned in the state corresponding to the relevant driving mode.

The processor receives a steering value obtained from a steering value obtaining part. However, since the maximum value of a steering angle of the controlling wheel part 30 is varied depending on a drive velocity, the vehicle 1 may be overturned if a steering angle of the controlling wheel part 30 is calculated by multiplying a steering value by a constant gain value. The controlling wheel part 30 is rotated in the steering angle and overturn might happen. Accordingly, for safe driving, the gain value, which is a multiplier of the steering gain, should be corrected based on the drive velocity.

Figure 6:
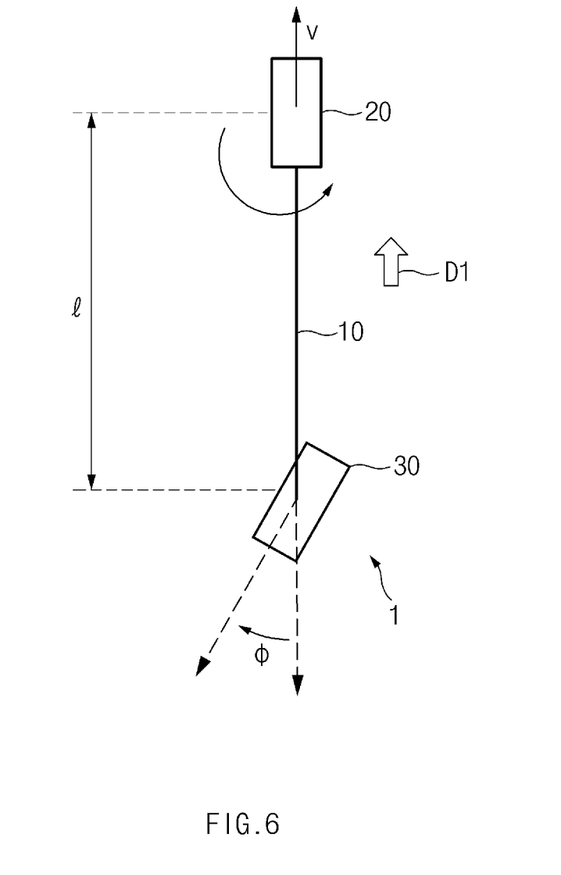
FIG. 6 is a free body diagram illustrating a vehicle in a three-wheel mode when viewed from the top, according to an embodiment of the present disclosure.
Figure 7:
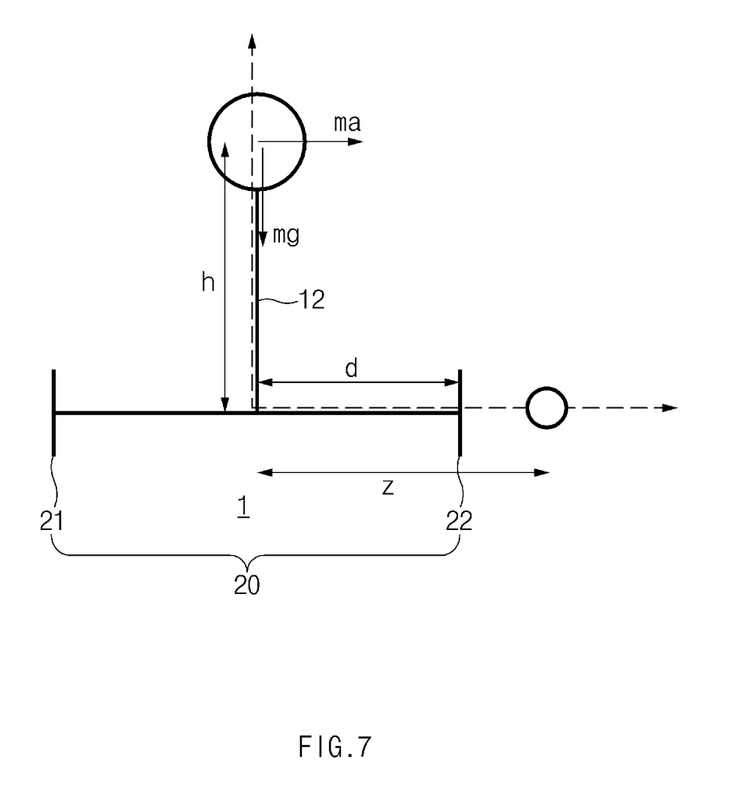
FIG. 7 is a free body diagram illustrating a vehicle when viewed from the rear, according to an embodiment of the present disclosure.
Figure 8:
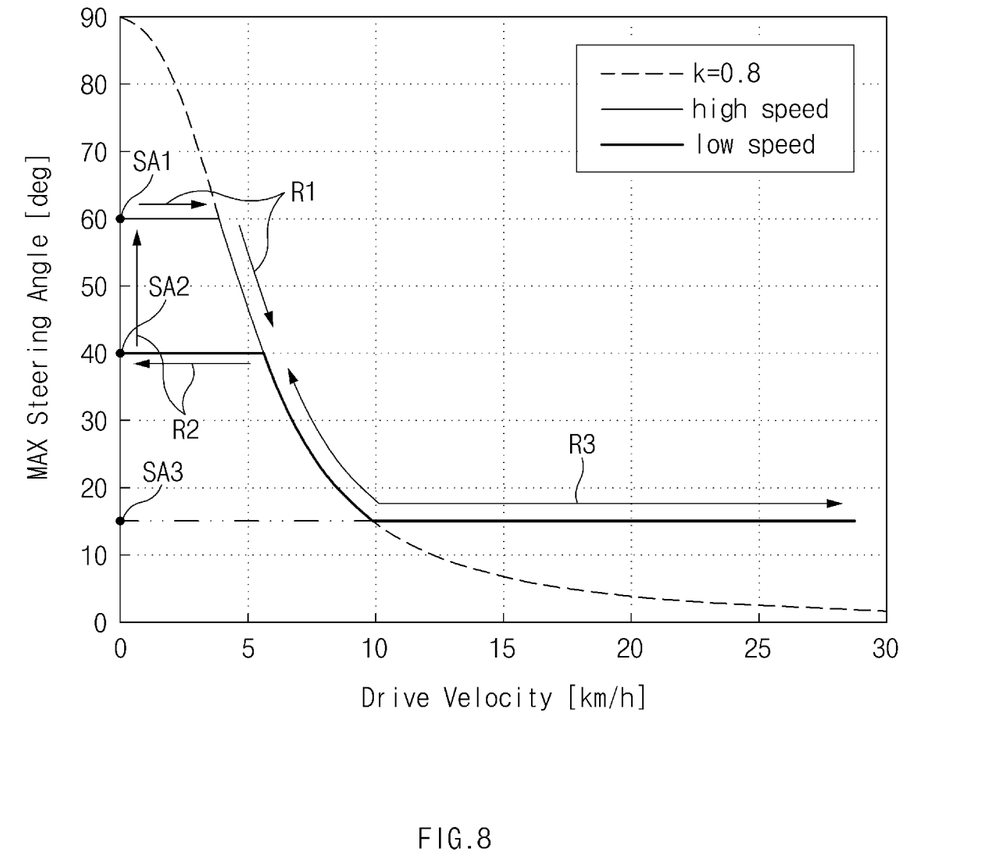
FIG. 8 is a graph illustrating the relationship between a drive velocity and a maximum steering angle, which are represented on a horizontal axis and a vertical axis, respectively, in a three-wheel mode of a vehicle, according to an embodiment of the present disclosure.

FIG. 6 is a free-body diagram illustrating the vehicle 1 in a three-wheel mode when viewed from the top, according to an embodiment of the present disclosure. FIG. 7 is a free-body diagram illustrating the vehicle 1 in a three-wheel mode when viewed from the rear, according to an embodiment of the present disclosure. FIG. 8 is a graph illustrating the relationship between a drive velocity and a maximum steering angle, which is represented on a horizontal axis and a vertical axis, respectively, in a three-wheel mode of the vehicle 1, according to an embodiment of the present disclosure.

In the three-wheel mode, the processor may control a three-wheel gain value to be reduced, as the drive velocity is increased, in which the three-wheel gain value becomes equal to a steering angle when a steering value serving as a specified angle input by the user is multiplied by the three-wheel steering gain value. In particular, the processor may determine the steering angle at which the controlling wheel part 30 is rotated, by applying the three-wheel steering gain value satisfying following Equation 1.

$$GT = \frac{\tan^{-1}\frac{glKd}{v^2h}}{IN\max} \quad \text{Equation 1}$$

In this case, 'GT' denotes the three-wheel steering gain value, 'g' denotes the acceleration of gravity, 'd' denotes the distance from the center of the main body 10 to each driving wheel 20, 'v' denotes the drive velocity, 'h' denotes a vertical distance to the center of gravity of the user from the center of the main body 10, 'K' denotes a value to determine a safety range exceeding 0 and equal to or less than 1, and 'INmax' denotes the maximum value of the steering value.

To obtain such a value, a lateral acceleration (see 'a' of FIG. 7) applied to the user is obtained by approximating $$\frac{v^2 \tan\phi}{l}$$

($\Phi$ denotes steering angle) on the assumption that the rotational speed of the controlling wheel part 30 is '0', and the moment applied to the vehicle 1 at a specified position (which is a point at a distance of 'z' in the horizontal direction from the center of the vehicle 1) based on the acceleration of gravity is brought into equilibrium with the moment applied to the vehicle 1 through the lateral acceleration in FIG. 7. GT can be obtained through the substitution of the range (exceeding 0 and equal to or less than 1) of K=z/d, which allows the vehicle 1 to safely travel without overturning, and the sum of the above-mentioned values.

As the three-wheel steering gain value depending on the drive velocity is corrected through Equation 1 and applied, the vehicle 1 may be controlled stably without overturning in the three-wheel mode.

For enhancing driving stability, a steering angle when the drive velocity is increased may be equal to or less than a specific max steering angle (SA1) for acceleration, and a steering angle when the drive velocity is decreased may be a specific max steering angle (SA2) for deceleration, which is less than the specific max steering angle (SA1) for acceleration, when the drive vehicle is equal to or less than a specific threshold velocity.

Accordingly, when the steering angle is calculated to be equal to or more than the max steering angle (SA1) for the acceleration, there may be provided a first route (R1) including a section of constantly maintaining the max steering angle (SA1) for the acceleration and a section of decreasing the steering angle to the specific max steering angle (SA2) for deceleration from the max steering angle (SA1) for acceleration. In deceleration, when the steering angle is calculated to be greater than the specific max steering angle (SA2) for deceleration, there may be provided a second route (R2) including a section of constantly maintaining the maximum steering angle to be the specific max steering angle (SA2) for deceleration, as illustrated in the drawings. Although FIG. 8 illustrates that the max steering angle (SA2) for deceleration is 60° and the max steering angle (SA2) for deceleration is 40° in the state that the value of 'K' is set to 0.8, the present disclosure is not limited thereto.

As illustrated in FIG. 8, it may be taken into consideration that the direction is switched at a lower speed after driving along the first route (R1) allowing the greater steering angle when acceleration is made from a lower speed to a middle and high speed. In addition, when deceleration is made from the middle and high speed to the lower speed, the driving is allowed along the second route (R2) allowing the less steering angle to prevent a sudden change in steering angle. The processor may control the vehicle 1 in the three-wheel mode to follow a hysteresis loop based on the first route (R1) and the second route (R2). In the case of a specific velocity greater than the threshold velocity, the processor may perform a control operation along a third route (R3) including a section for a max steering angle (SA3) for the high velocity, in which the maximum steering angle is less than the max steering angle (SA2) for deceleration.

Meanwhile, the three-wheel steering gain value may be maintained to be equal to a first three-wheel gain value when the drive velocity is less than a first threshold velocity, maintained to be equal to a second three-wheel gain value when the drive velocity is equal to or greater than a second threshold velocity, and non-linearly reduced as the drive velocity is increased when the drive velocity is equal to or greater than the first threshold velocity and less than the second threshold velocity. In this case, the second threshold velocity may be greater than the first threshold velocity. Although FIG. 8 illustrates that the first threshold velocity is 4 km/h, and the second threshold velocity is 10 km/h, the present disclosure is not limited thereto.

Figure 9:
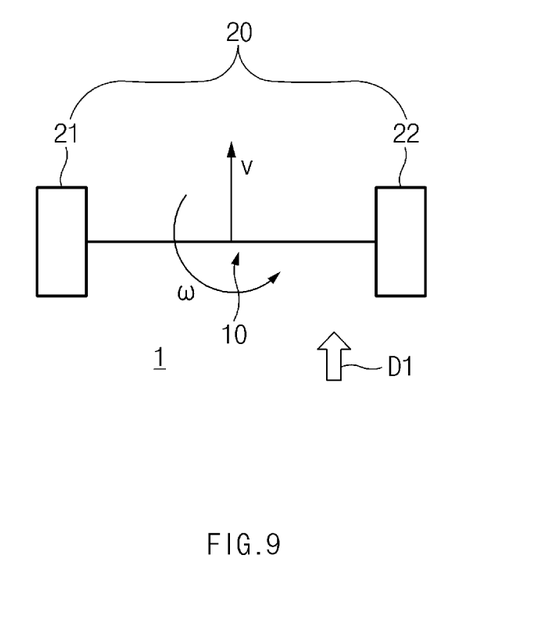
FIG. 9 is a free body diagram illustrating a vehicle in a two-wheel mode when viewed from the top, according to an embodiment of the present disclosure.

FIG. 9 is a free body diagram illustrating a vehicle in a two-wheel mode when viewed from the top, according to an embodiment of the present disclosure.

In addition, in the two-wheel mode, the two driving wheels 20 may be steered in the state that an imbalance in velocity of the two driving wheels 20 may be formed as the handle 14 is operated. In particular, the processor may calculate the two-wheel steering gain value, which is used to determine the difference (w) in velocity of the two driving wheels 20, such that the two-wheel steering gain value satisfies following Equation 2, as a steering value input by the user is multiplied by the two-wheel steering gain value, thereby determining the difference in velocity of the two driving wheels 20.

$$GD = \frac{gKd}{hvlN\max} \quad \text{Equation 2}$$

In this case, 'GD' denotes the two-wheel steering gain value, 'g' denotes the acceleration of gravity, 'd' denotes the distance from the center of the main body 10 to each driving wheel 20, 'v' denotes the drive velocity, 'K' denotes a value to determine a safety range exceeding 0 and equal to or less than 1, 'h' denotes a vertical distance to the center of gravity of the user from the center of the main body 10, and 'INmax' denotes the maximum value of the steering value.

Although the procedure of calculating Equation 2 is similar to the procedure of obtaining Equation 1, the two procedures differ from each other in that the lateral acceleration approximates to the product of the drive velocity and the angular velocity.

As described above, as the processor performs a control operation to correct and apply the steering gain value depending on the drive velocity in each driving mode, the vehicle 1 according to an embodiment of the present disclosure may stably drive without overturning even if the user approximately inputs the steering value.

Accordingly, two-wheel mode driving or three-wheel mode driving may be performed through the vehicle.

The user may ride in the vehicle in various postures.

Even if there is a change in the drive velocity, the user may stably drive the vehicle without overturning.

The rotation radius of the vehicle may be adjusted.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle comprising:
a main body configured to allow a user to ride on the main body;
two driving wheels rotatably coupled to the main body; and
a controlling wheel part rotatably coupled to the main body to control a direction of the vehicle, in which the main body travels at a specific drive velocity by making contact with a ground surface to rotate about a vertical axis in a three-wheel mode,
wherein the main body includes:
a seat part formed to receive the user in a seated position;
a steering part configured to obtain an inclination degree of the seat part to perform steering based on the inclination degree in which the user seated on the seat part is inclined, in the three-wheel mode; and
a post configured to connect the steering part with the seat part, and
wherein the steering part includes;
a steering shaft member coupled to the post to rotate in connection to the inclination degree of the seat part;
a steering value obtaining part configured to obtain a steering value based on a degree in which the steering shaft member rotates;
a steering returning part comprising an elastic member arranged in the vertical direction and a cam provided at a lower end of the elastic member having an outer surface in a curved shape, and the elastic member being coupled to the steering shaft member at an upper end of the elastic member to rotate in connection to rotation of the steering shaft member; and
a steering housing including a guide surface formed inside the steering housing and inclined such that the outer surface of the cam makes contact with the guide surface while sliding.

2. The vehicle of claim 1, wherein the controlling wheel part is positioned further back in the vehicle than the two driving wheels, in the direction in which the main body travels, in the three-wheel mode.

3. The vehicle of claim 1, wherein the main body further includes:
a distance adjusting part to adjust a distance between the controlling wheel part and the driving wheels, in the three-wheel mode.

4. The vehicle of claim 1, wherein the controlling wheel part is selectively operable in a two-wheel mode, and the controlling wheel part is spaced apart from the ground surface in the two-wheel mode and selectively performs one of the two-wheel mode and the three-wheel mode.

5. The vehicle of claim 4, wherein the main body further includes:
a handle operated by the user such that the main body is steered, in the two-wheel mode.

6. The vehicle of claim 5, wherein steering of the vehicle is performed by forming an imbalance in velocity of the two driving wheels as the handle is operated, in the two-wheel mode.

7. The vehicle of claim 1, wherein a three-wheel gain value determined via a processor, which is used to determine a steering angle allowing the controlling wheel part to rotate as a steering value input by the user multiplied by the three-wheel gain value, is reduced as the drive velocity is increased in the three-wheel mode.

8. The vehicle of claim 1, wherein a three-wheel gain value determined via a processor, which is used to determine a steering angle allowing the controlling wheel part to rotate as a steering value input by the user multiplied by the three-wheel gain value, in the three-wheel mode,
is maintained to be equal to a first three-wheel gain value, when the drive velocity is less than a first threshold velocity,
is maintained to be equal to a second three-wheel gain value, when the drive velocity is equal to or greater than a second threshold velocity, and
is non-linearly reduced as the drive velocity is increased, when the drive velocity is equal to or greater than the first threshold velocity and less than the second threshold velocity, and
wherein the second threshold velocity is less than the first threshold velocity.

9. The vehicle of claim 1, wherein a three-wheel gain value determined via a processor, which is used to determine a steering angle allowing the controlling wheel part to rotate as a steering value input by the user multiplied by the three-wheel gain value, in the three-wheel mode, satisfies following equation:

$$GT = \frac{\frac{glKd}{v^2h}}{IN\max},$$

in which 'GT' denotes the three-wheel steering gain value, 'g' denotes the acceleration of gravity, 'd' denotes a distance from the center of the main body to each driving wheel, 'v' denotes the drive velocity, 'K' denotes a value to determine a safety range exceeding 0 and equal to or less than 1, 'h' denotes a vertical distance to the center of gravity of the user from the center of the main body, and 'INmax' denotes a maximum value of the steering value.

10. The vehicle of claim 1,
wherein a steering angle allowing the controlling wheel part to rotate when the drive velocity is increased, is equal to or less than a specific max steering angle for acceleration, and the steering angle when the drive velocity is decreased, is a specific max steering angle for deceleration, which is less than the specific max steering angle for acceleration, when the drive velocity is equal to or less than a specific threshold velocity, and
wherein the vehicle further comprising;
a storage medium storing the max steering angle for acceleration and the max steering angle for deceleration, and
a processor to control the operation of the vehicle.

11. The vehicle of claim 4, wherein a two-wheel gain value determined via a processor, which is used to determine a difference in velocity between the two driving wheels as a steering value input by the user multiplied by the two-wheel gain value, in the two-wheel mode, satisfies following equation:

$$GD = \frac{gKd}{hvINmax},$$

in which 'GD' denotes the two-wheel steering gain value, 'g' denotes the acceleration of gravity, 'd' denotes a distance from the center of the main body to each driving wheel, 'V denotes the drive velocity, 'K' denotes a value to determine a safety range exceeding 0 and equal to or less than 1, 'h' denotes a vertical distance to the center of gravity of the user from the center of the main body, and 'INmax' denotes a maximum value of the steering value.

12. The vehicle of claim 4, further comprising:
an inclination obtaining part configured to obtain an inclination in which the main body is inclined forward or rearward, in the two-wheel mode,
wherein the driving wheel is accelerated or decelerated based on the inclination obtained from the inclination obtaining part.

13. The vehicle of claim 4, wherein an angle, in which the post is formed with respect to the steering part, is constantly maintained in the two-wheel mode.

14. The vehicle of claim 4, wherein an operation of the handle is irrelevant to an operation of the steering part in the three-wheel mode.

15. The vehicle of claim 1, wherein the seat part is liftable.

16. A vehicle comprising:
a main body configured to allow a user to ride on the main body;
two driving wheels rotatably coupled to the main body; and
a controlling wheel part rotatably coupled to the main body to control a direction of the vehicle, in which the main body travels at a specific drive velocity by making contact with a ground surface to rotate about a vertical axis in a three-wheel mode,
wherein the main body includes:
a seat part formed to receive the user in a seated position;
a steering part configured to obtain an inclination degree of the seat part to perform steering based on the inclination degree in which the user seated on the seat part is inclined, in the three-wheel mode; and
a post configured to connect the steering part with the seat part, and
a steering housing including a guide surface formed inside the steering housing and inclined such that the outer surface of the cam makes contact with the guide surface while sliding,
wherein a three-wheel gain value determined via a processor, which is used to determine a steering angle allowing the controlling wheel part to rotate as a steering value input by the user multiplied by the three-wheel gain value, is reduced as the drive velocity is increased in the three-wheel mode.

* * * * *